United States Patent [19]

Reifenhaüser

[11] Patent Number: 4,488,861
[45] Date of Patent: Dec. 18, 1984

[54] BLOWING HEAD FOR MAKING A SYNTHETIC-RESIN TUBE

[75] Inventor: Hans Reifenhaüser, Troisdorf, Fed. Rep. of Germany

[73] Assignee: Reifenhäuser GmbH & Co. Maschinenfabrik, Troisdorf, Fed. Rep. of Germany

[21] Appl. No.: 479,950

[22] Filed: Mar. 29, 1983

[30] Foreign Application Priority Data

Mar. 31, 1982 [DE] Fed. Rep. of Germany ....... 3211833

[51] Int. Cl.³ .............................................. B29F 3/08
[52] U.S. Cl. ............................. 425/379 R; 264/40.6; 264/209.7; 425/326.1; 425/380; 425/467
[58] Field of Search ............... 425/467, 326.1, 378 R, 425/379 R, 380, 143, 144; 264/519, 564–569, 209.7, 558, 40.6

[56] References Cited

U.S. PATENT DOCUMENTS

| | | | |
|---|---|---|---|
| 2,796,632 | 6/1957 | Willert | 425/144 |
| 3,385,917 | 5/1968 | Breukink et al. | 425/379 R |
| 3,525,125 | 8/1970 | Berger et al. | 425/326.1 |
| 3,726,743 | 4/1973 | Reifenhauser et al. | 425/326.1 |
| 3,822,977 | 7/1974 | Hinrichs | 425/326.1 |
| 3,926,706 | 12/1975 | Reifenhauser et al. | 264/173 |
| 3,930,768 | 1/1976 | Zimmermann et al. | 425/326.1 |
| 3,950,118 | 4/1976 | Adair | 425/379 R |
| 3,957,566 | 5/1976 | Rahifs | 264/173 |
| 4,088,434 | 5/1978 | Fukuda et al. | 425/379 R |
| 4,339,403 | 7/1982 | Upmeier et al. | 264/40.6 |

FOREIGN PATENT DOCUMENTS

| | | | |
|---|---|---|---|
| 2947293 | 5/1981 | Fed. Rep. of Germany . | |
| 46-7192 | 2/1971 | Japan | 425/378 R |
| 53-130763 | 11/1978 | Japan | 264/40.6 |
| 2074349A | 10/1981 | United Kingdom | 264/40.6 |
| 863392 | 9/1981 | U.S.S.R. | 425/378 R |

Primary Examiner—Jeffery Thurlow
Attorney, Agent, or Firm—Karl F. Ross

[57] ABSTRACT

An apparatus for forming a thin-wall and flattenable synthetic-resin tube has inner and outer nozzle parts generally centered on a common axis and defining an annular passage centered on the axis. At least one of the parts is formed with an annular and substantially closed chamber juxtaposed with the passage and extending axially therealong. A hot plastic mass is fed under pressure to one end of the passage so that it passes axially along the passage to emerge from the other end thereof as a tube. A body of liquid partially fills the chamber, this liquid being vaporizable generally at the temperature of the hot mass in the passage. Thus the liquid is vaporized at hot spots of the passage and the vapor thus produced condenses in cool spots of the passage. The space in the chamber above the liquid body is normally largely evacuated. The liquid may be water.

11 Claims, 3 Drawing Figures

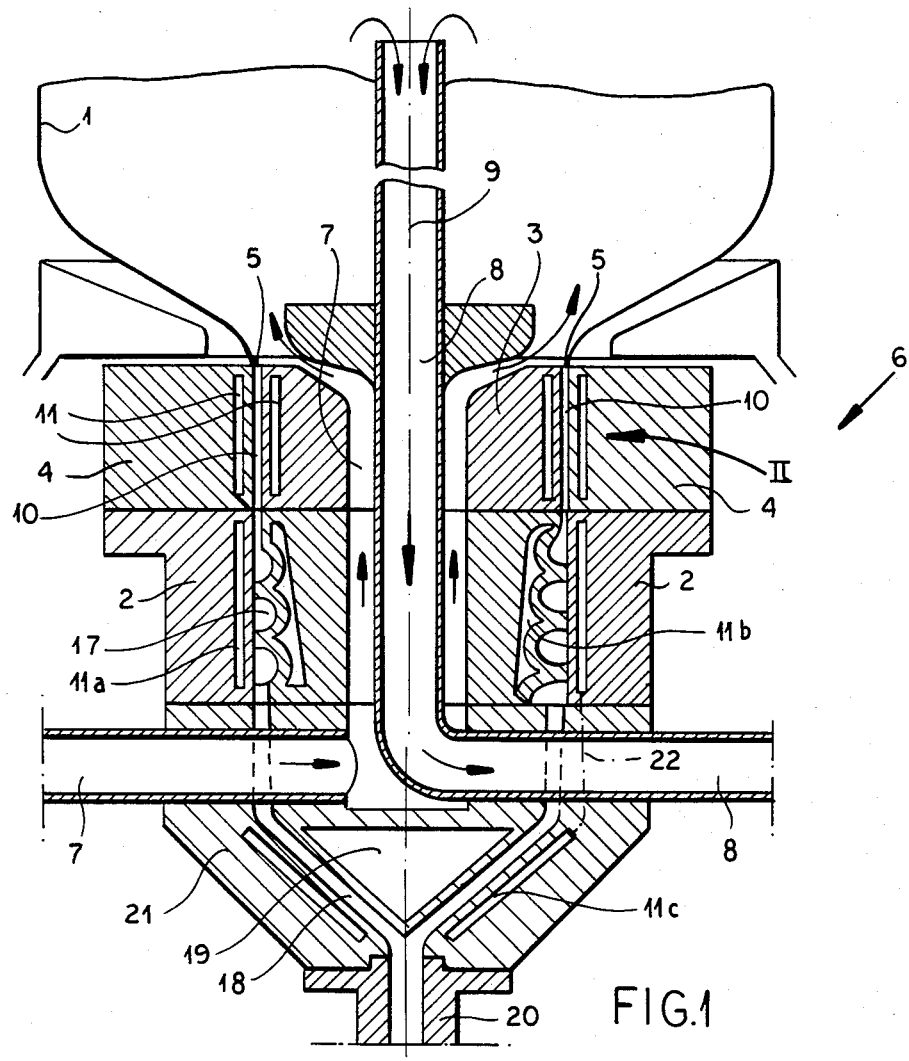
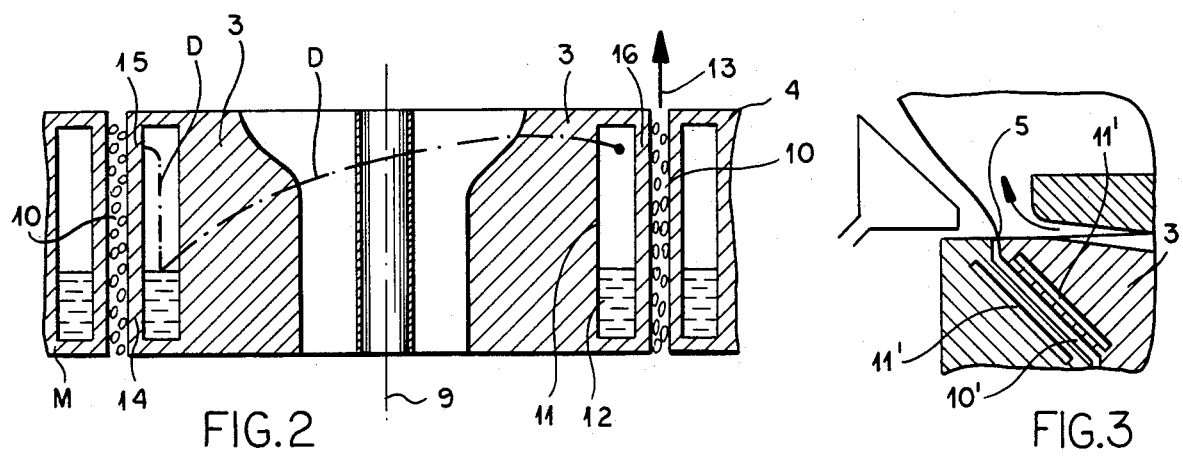

BLOWING HEAD FOR MAKING A SYNTHETIC-RESIN TUBE

FIELD OF THE INVENTION

The present invention relates to an apparatus for blow-extruding a synthetic-resin tube. More particularly this invention concerns a blowing head that produces a thin-wall tube suitable for flattening into a sheet.

BACKGROUND OF THE INVENTION

It is known, as for example from commonly owned U.S. Pat. No. 3,926,706 to produce synthetic-resin sheeting by extruding a thin-wall tube that is internally inflated to cool and stretch it, and then flattening this tube. Two concentric tubes can be thus formed with different degrees of stretch to form a laminated sheet. The wall thickness of the film must be as uniform as possible. Typically a variation in thickness of $+/-8\%$ is the maximum acceptable, and preferably it should be at most $+/-5\%$.

To control this thickness, which depends mainly from the viscosity of the resin and the size of the passage it is being extruded through, it is known to differentially heat and cool portions of the tube in the extruder head. Thus, as described in German patent document No. 2,947,293, an annular array of heat-exchange compartments is provided around the extrusion nozzle. Each heat-exchange compartment is associated with a respective sensor and source of heat-exchange liquid so that it can heat the respective section of the tube being extruded when it is too thick, thereby making it less viscous, or cool the section when it is too thin.

This arrangement is extremely complex. For best control of the tube thickness it is necessary to provide at least one hundred such compartments and sensors. The control system for these elements is extremely unwieldy and prone to breakdown. Even when it works perfectly, this system rarely produces a satisfactorily uniform product.

Other systems are known which have a plurality of angularly equispaced and radially extending adjustment screws that can be adjusted to control the passage thickness. Such arrangements are extremely hard to operate and cannot normally be adjusted while a tube is being formed. Much less it is impossible for them to compensate for momentary problems, as for instance when a lump of inadequately plastified resin comes into the passage and blocks it at one location.

OBJECTS OF THE INVENTION

It is therefore an object of the present invention to provide an improved tube-making apparatus.

Another object is the provision of such a tube-making apparatus which overcomes the above-given disadvantages.

A further object is to provide an automatically adjusting apparatus for extruding a thin-wall tube of almost perfectly uniform wall thickness.

SUMMARY OF THE INVENTION

These objects are attained according to the instant invention in an apparatus for forming a thin-wall and flattenable synthetic-resin tube which has inner and outer nozzle parts generally centered on a common axis and defining an annular passage centered on the axis. At least one of the parts is formed with an annular and substantially closed chamber juxtaposed with the passage and extending axially therealong. A hot plastic mass is fed under pressure to one end of the passage so that it passes axially along the passage to emerge from the other end thereof as a tube. A body of liquid partially fills the chamber, this liquid being vaporizable generally at the temperature of the hot mass in the passage. Thus the liquid is vaporized at hot spots of the passage and the vapor thus produced condenses in cooler spots of the passage.

The invention is based on the fact that in such a nozzle or manifold and nozzle assembly the plastified resin that is fed in is not of perfectly uniform viscosity, so that flow is different in different parts of the passage. The portion of the flow of low viscosity and high temperature heats the apparatus locally, thereby further reducing the viscosity of the resin contacting this part of the device, and similarly parts of the apparatus exposed to the cooler and more viscous resin are maintained cool thereby. With the system of this invention the hot spots vaporize the liquid near them, thereby cooling these regions and producing hot vapor which naturally moves in the chamber to cooler spots where it condenses, simultaneously giving up its heat of evaporation. As a result wholly autogenous temperature control is achieved. Utilizing the latent heat of evaporation and condensation in this manner makes the system capable of responding to extremely small local temperature variations. Once the passage is maintained at the same temperature, one can be assured that the finished product will be of nearly perfectly uniform wall thickness. The ability of a liquid, such as water, to transmit the heat from one location to another is about one thousand times greater than would be the case in a standard metal device where only nominal temperature equalization is obtained by conduction through the metal.

The system according to this invention is wholly automatic and autogenous. It relies on no external control system so it can be counted on to function without fail. Once the proper adiabatic relationships are established, by use of a liquid which vaporizes at a temperature which is slightly too hot for the resin being extruded and which condenses at a temperature which is slightly too cool for this resin, the device will function flawlessly with no outside intervention.

According to this invention the chamber is substantially evacuated above the liquid body. This liquid can be distilled water. In fact the underpressure above the liquid can be used to vary the boiling point of the liquid, thereby exactly tailoring it to the temperature at the chamber location. In addition the chamber may be provided with a wick to ensure that, by capillary action, the liquid contacts the hottest parts of the device.

According to another feature of this invention the apparatus has a plurality of such chambers spaced axially along the passage from one another. A passage can interconnect at least two of the chambers. In addition one such chamber can be provided inside and one outside the passage, for maximum temperature-equalization effect.

The apparatus has a manifold connected between the upstream end of the passage and the extruder. This manifold is formed with another such chamber containing another such body. In addition the manifold can be formed radially inward of the passage with a nonannular chamber that is substantially closed and that contains yet another such liquid body.

Normally according to this invention the chamber is equidistant from and the same general shape as the passage. In addition it is normally centered on the axis, that is axially symmetrical.

DESCRIPTION OF THE DRAWING

The above and other features and advantages will become more readily apparent from the following, reference being made to the accompanying drawing in which:

FIG. 1 is a partly diagrammatic axial section through the apparatus of this invention;

FIG. 2 is a large-scale view of the detail indicated at II in FIG. 1; and

FIG. 3 is a sectional view of a detail of an alternative arrangement according to the invention.

SPECIFIC DESCRIPTION

As seen in FIG. 1 a thin-walled polyethylene tube 1 is formed by a blowing head 6 having a distributor body 2 to which is fixed an inner part or core 3 and outer part or ring 4 forming with the core 3 a cylindrically annular passage 10 centered on a vertical axis 9 and having an upper outlet mouth 5 from which the tube emerges. An axially and radially extending passage 7 opens in the core 3 within the tube 1 and is supplied with a gas under pressure, and a central outlet conduit 9 connected to a vent pipe 8 serves to carry off this gas as it is heated by the tube 1.

An outlet nozzle or head 20 of an extruder is connected via a flaring passage 18 in a manifold 21 and through a distributor passage 17 in the distributor 2 to the lower upstream end of the passage 5. The passage 17 is of the nonuniform mixing type. This structure is all standard and can be seen in greater detail in the above-cited patents as well as in U.S. Pat. No. 3,726,743 and the references cited therein.

According to this invention the parts 3 and 4 are formed to each side of the passage with a cylindrical and closed annular chamber 11 shown in more detail in FIG. 2. These chambers 11 are each partially filled by a body 12 of distilled water, and the space above the water is evacuated. Since the chambers 11 are closely juxtaposed with the passage 10, the liquid body 12 is in good heat-exchange relationship with the resin in the passage 10. The boiling point of this liquid is such that if one portion of the passage such as here indicated at 14 becomes too hot, while other portions 15 and 16 are too cool, the liquid will vaporize at 14 and move up and around as indicated at D to contact the region 15 and 16 and condense. The latent heat of evaporation will cool the region 14 and the latent heat of condensation will heat the regions 15 and 16, thereby equalizing temperature and making the resin flow smoothly. The result is a tube whose wall thickness varies by less than +/−5%.

Further such chambers 11a and 11b flank the nonuniform distribution passage 17, and a frustoconical such chamber 11c surrounds the inlet passage 18. These chambers 11a—11c are wholly closed for autogenous and automatic temperature regulation of flow in the respective passages 17 and 18. Of course connections are provided for the initial filling and evacuation of the chambers, nonetheless in use there is no communication between the chamber and the exterior.

In addition a conical chamber 19 is formed within the passage 18 for further temperature equalization at this level. The wall thicknesses between the various chambers 11—11c and 19 and the respective passages 10, 17, and 18 are all substantially uniform. It is also possible as indicated at dot-dash line 22 for a small passage to interconnect two chambers, here the chambers 11b and 11c, for fluid exchange and temperature equalization between them.

FIG. 3 shows a variation where the passage 10' is frustoconically inclined and centered on the axis 9. The chambers 11' are similarly frustoconical and perfectly parallel to the passage 10'. This device can produce a larger diameter tube than the device of FIGS. 1 and 2.

The system of this invention requires no outside adjustment. Once in operation it will automatically equalize the temperature in the passage, thereby ensuring that the resin passing through it will be of even temperature and viscosity. The result is an extremely uniform product.

I claim:

1. An apparatus for forming a thin-wall and flattenable synthetic-resin tube, the apparatus comprising:
   inner and outer nozzle parts generally centered on a common axis and defining an annular passage centered on the axis, the parts being formed with respective annular, independent, and substantially closed chambers juxtaposed with the passage and extending axially therealong, one of the chambers being radially inside the passage and the other chamber being axially level with the inner chamber and radially outside the passage;
   means for feeding a hot plastic mass under pressure to one end of the passage, whereby the mass passes axially along the passage to emerge from the other end thereof as a tube; and
   respective independent bodies of liquid partially filling the chambers, the liquid being vaporizable generally at the temperature of the hot mass in the passage, whereby the liquid is vaporized at hot spots of the passage and the vapor thus produced condenses in cool spots of the passage.

2. The tube-making apparatus defined in claim 1 wherein the chamber is substantially evacuated above the liquid body.

3. The tube-making apparatus defined in claim 2 wherein the liquid is water.

4. The tube-making apparatus defined in claim 1 wherein the apparatus has a plurality of such chambers spaced axially along the passage from one another.

5. The tube-making apparatus defined in claim 1 wherein the apparatus further comprises a manifold connected between the upstream end of the passage and the means, this manifold being formed with another such chamber containing another such body.

6. The tube-making apparatus defined in claim 5 wherein the manifold is formed within the passage with a nonannular chamber that is substantially closed and that contains yet another such liquid body.

7. The tube-making apparatus defined in claim 1 wherein the chambers are equidistant from and the same general shape as the passage.

8. The tube-making apparatus defined in claim 7 wherein the chambers are centered on the axis.

9. The tube-making apparatus defined in claim 1 wherein the chambers and passage are of substantially identical shape.

10. The tube-making apparatus defined in claim 9 wherein the chambers and passage are cylindrical and coaxial.

11. The tube-making apparatus defined in claim 9 wherein the chambers and passage are frustoconical and coaxial.

* * * * *